United States Patent [19]

Kühn

[11] Patent Number: 4,723,409
[45] Date of Patent: Feb. 9, 1988

[54] SAFETY CIRCUIT FOR A HYDRAULIC SYSTEM

[75] Inventor: Matthias Kühn, Braunschweig, Fed. Rep. of Germany

[73] Assignee: Mannesmann Rexroth GmbH, Fed. Rep. of Germany

[21] Appl. No.: 832,525

[22] Filed: Feb. 21, 1986

[30] Foreign Application Priority Data

Feb. 22, 1985 [DE] Fed. Rep. of Germany ....... 3506335

[51] Int. Cl.$^4$ .................... F16D 31/02; F15B 11/00
[52] U.S. Cl. ............................... 60/422; 91/516
[58] Field of Search ................. 60/421, 422; 91/516

[56] References Cited

U.S. PATENT DOCUMENTS

| 4,034,563 | 7/1977 | Orth | 60/422 |
| 4,343,151 | 10/1982 | Lorimor | 91/516 |
| 4,479,349 | 10/1984 | Westreen | 60/422 |
| 4,625,748 | 12/1986 | Muncke et al. | 60/422 |

FOREIGN PATENT DOCUMENTS 3445516 12/1984 Fed. Rep. of Germany .

Primary Examiner—A. Michael Chambers
Attorney, Agent, or Firm—Ostrolenk, Faber, Gerb & Soffen

[57] ABSTRACT

A safety circuit which is essentially for supplyng hydraulic loads. Briefly stated, this circuit has a control pump which, via a priority valve, supplies hydraulic power to a power steering hydraulic circuit and at least one other load hydraulic circuit on a priority basis where the power steering receives the highest priority. Also provided is a control circuit which limits the intake pressure of the control pump and has a safety valve associated with it which is controlled by the intake vacuum of the control pump. This valve effects a reduction of the pump output when pressure in the suction line from the hydraulic fluid storage container drops below a minimum pressure. The safety valve cooperates with the priority valve such that it brings the priority valve into a first operational condition when there is sufficient suction pressure thereby supplying power to the power steering hydraulic circuit and other loads, and into a second operational condition in which the flow of hydraulic fluid to all loads but the power steering circuit is interrupted. The safety valve therefore prevents cavitation in the control pump while providing for a provision of hydraulic fluid to only the power steering circuit when the volume of hydraulic fluid in the system falls below a predetermined value.

17 Claims, 1 Drawing Figure

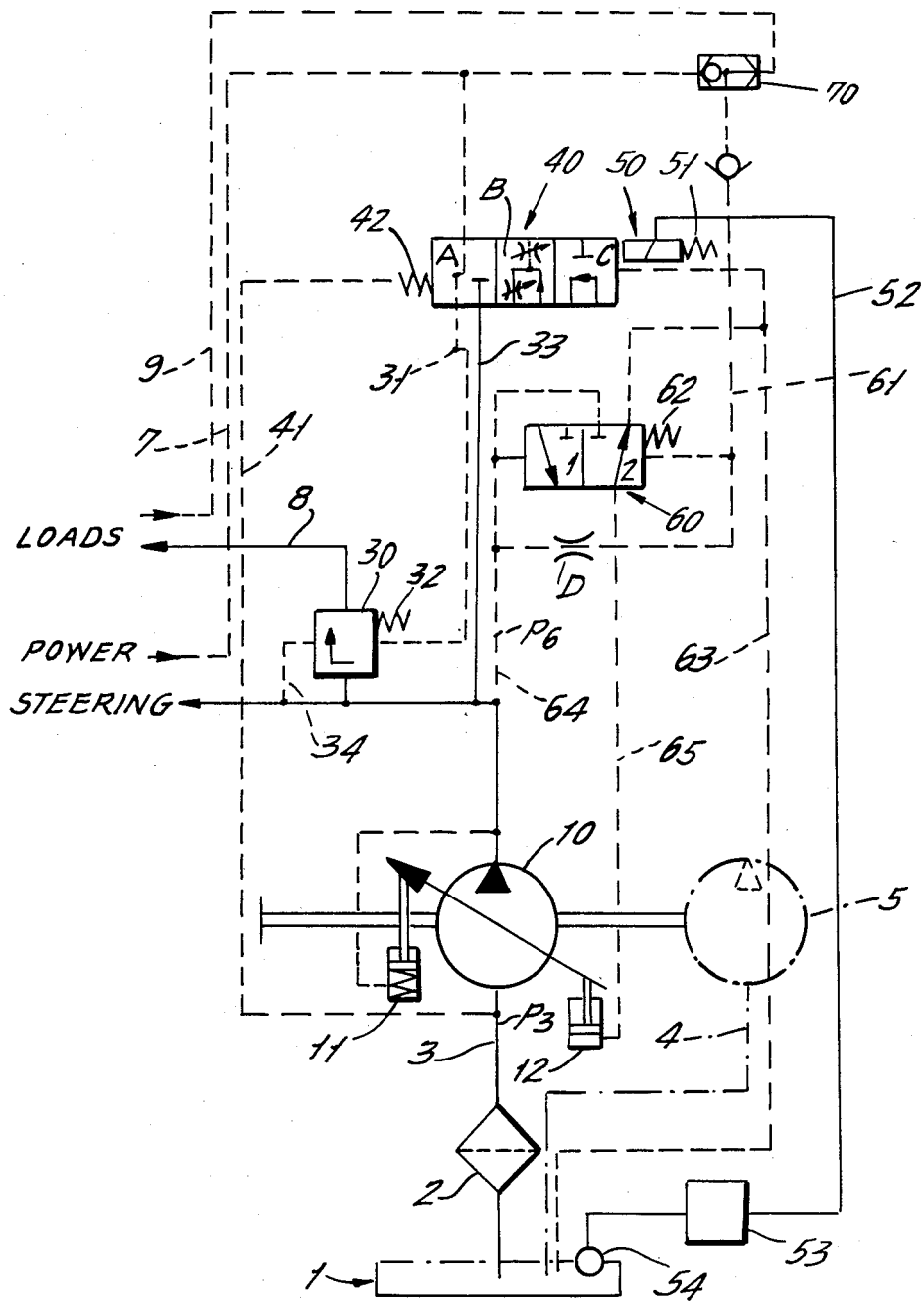

SAFETY CIRCUIT FOR A HYDRAULIC SYSTEM

BACKGROUND OF THE INVENTION

The present invention relates to a safety circuit for a hydraulic system.

Agricultural tractors are increasingly being equipped with controlled hydraulic systems in which oil is supplied via axial-piston control pumps. For energy considerations, load-sensing systems are used for regulation of the pump. In such systems, the instantaneous delivery stream and pressure of the pump are regulated as a function of the required output of the consuming device. Such hydraulic systems are known as closed-center, load-sensing, hydraulic systems.

In order for the power steering of a hydraulic tractor to be operable at all times, the hydraulic system is provided with a priority valve which is a pressure balance or governor integrated into the pressurized fluid line leading from the control pump to the load hydraulic circuit. The steering valve for the power steering hydraulic circuit, however, is connected directly to the control pump. The pressure difference which occurs at the steering valve acts on a controller piston of the priority valve in such a manner that increased demand for power on the part of the steering will cause the flow of fluid to the load-hydraulic circuit to be throttled.

The axial flow piston control pump used in the above-described hydraulic system has the disadvantage that, regardless of its specific structural development, it reacts relatively sensitively to excessive vacuum in its suction line. One approach to solve this problem has been the provision of an additional feed pump which conveys hydraulic fluid from a storage container into the suction line of the control pump. This maintains a sufficiently high pressure level. However, since the feed pump is generally a gear pump which pumps a constant volumetric flow, it must be designed for the maximum delivery of the control pump. This therefore leads to an uneconomical design. Since the maximum delivery of the control pump is required only infrequently, that is only for periods of time which constitute a mere fraction in the range of 1% of the total operating time of the hydraulic system, the excess amount of the flow conveyed by the feed pump must be sprayed off into the storage container.

Another method has been proposed which uses a feed pump to convey only a fraction of the requirement of the control pump. In case there is a greater need for fluid, the control pump draws fluid, via an additional line, directly from the storage container. However, this approach gives satisfactory results only if the fluid is of sufficient temperature and if the suction line is of a suitable cross section. Otherwise, an unacceptably high pressure drop may occur in the suction line and thus cavitation may occur at the control pump. More particularly, upon a cold start and under low ambient temperature conditions, it is difficult to reliably prevent cavitation because the viscosity of the fluid causes the pressure drop to increase.

One approach to a more optimal hydraulic system may be found in German Patent DE-PS No. 34 45 516, which corresponds to U.S. patent application Ser. No. 807,983 filed Dec 12, 1985. This describes a safety circuit wherein if the pressure drops below a minimum but still permissible suction pressure of the control pump, the pump output will be reduced while the suction pressure is increased. This safety circuit operates reliably for protecting the control pump. However, the component parts of this safety circuit are used exclusively for protection of the control pump. Therefore, additional safety functions, such as insuring that hydraulics are supplied to the power steering hydraulic circuit, cannot be fulfilled by these parts.

Accordingly, it is an object of the present invention to create a safety circuit which reliably protects the control pump from cavitation while being simultaneously used to supply the power steering itself with a hydraulic fluid, even in the event that a leak should occur in the load-hydraulic circuit.

Further it is an object of the present invention to provide a safety circuit for a hydraulic system, comprising a control pump; a priority valve connected to the control pump and being operable in two conditions wherein in one condition the priority valve is held in a throttling position for supplying hydraulic fluid to a plurality of hydraulic loads, and in a further condition is for supplying hydraulic fluid to a single hydraulic load, to the exclusion of all remaining hydraulic loads; and a control circuit having a safety valve which is connected to the control pump for limiting the intake pressure of the control pump, the safety valve being controlled by the intake vacuum of the control pump so as to reduce the output of the control pump in response to a drop in the intake pressure of the control pump below a predetermined value, the safety valve also being connected to the priority valve for maintaining the priority valve in the first operational condition when the intake pressure of the control pump is at or above a predetermined value and for maintaining the priority valve in the second operational condition when the intake pressure falls below a predetermined value.

It has been discovered that, by coupling the priority and safety valves, an advantage is provided which uses the safety valve as a sole, yet doubly controllable control valve should the suction pressure assume an unacceptable level and in the event that the level of liquid in the supply container drops below a predetermined level.

The safety valve therefore provides two functions and results in decreased cost. The reason why the safety circuit can be constructed in the described manner, is that the power steering hydraulic circuit requires relatively little oil as compared with the output capacity of normally installed control pumps. Therefore, when the pressure drops below a minimum specified suction pressure, sufficient reduction of the control pump will always take place thereby permitting the suction pressure to once again rise. Also, an alternate embodiment of the present invention provides a manner in which the already existing parts of the control connection lines can be used as a differentially activated control line for priority valve purposes.

In a preferred embodiment the priority valve is designed as a pressure balance or pressure balance valve. According to the invention i.e. by connecting an input of said priority valve to the hydraulic fluid supply line of said first hydraulic load and the output of said priority valve to said second hydraulic load and by providing a control line transmitting a hydraulic pressure which is representative of the hydraulic pressure requirements of said hydraulic loads it becomes possible to maintain an already proposed design of the hydraulic circuit for the supply of the servo-steering hydraulic load circuit with priority and to give to this circuit at the same time by an especial integration of the pump pressure line new functions wherefrom economical advantages result. Additionally the control of the priority valve can be performed independent from any additional energy supply which results in higher reliability. By the inventive control of the priority valve the latter is maintained by use of a constant spring force in a position which blocks the load hydraulic circuit so that the priority valve upon switching of said safety valve can be shifted to a stable blocking position. If a change-over valve is provided which receives pressures representing the requirements of said hydraulic loads and further having an output having the respective higher hydraulic pressure acting at the respective inputs, wherein said output of said change-over valve is connected to said control valve which controls said output of said control pump as a function of said hydraulic pressure of said output of said change-over valve additional advantages which respect to the design of the control for the control valve result. This is due to the fact, that the control line always leads a pressure which represents the requirement of the respective consumer, so that the control can be performed by a fixed circuit connection.

If a sensor is provided and an actuator device is comprised of a solenoid, whereby said sensor produces an output signal at output terminals thereat only when a fluid level in an hydraulic fluid storage container is above a predetermined level, and wherein output terminals are connected to said solenoid, whereby said output signal maintains said actuator device in a first position which thereby maintains said safety valve in said first switch position, and whereby said solenoid further includes a spring biasing means for urging said solenoid into a further position and thereby urging said safety valve into said second switch position in the absence of said output signal, the level of safety is raised. In case said the control for the solenoid fails the spring biasing means ensure that the servo steering circuit is always supplied with priority.

BRIEF DESCRIPTION OF THE DRAWING

Reference can be now had to the accompanying drawing which shows the hydraulic connection diagram of a hydraulic system in accordance with the safety circuit of the present invention.

DETAILED DESCRIPTION OF THE PREFERRED EMBODIMENT

Referring now to the drawing, there is shown the hydraulic connection diagram and corresponding safety circuit for the hydraulic system of the present invention. There is a control pump 10, which is preferably an axial-flow piston pump. The control pump 10 has two actuator cylinders 11, 12 which are used for adjusting the volumetric flow required or the output of the pump. Actuator cylinder 11 is connected to the output pressure line of control pump 10 while actuator cylinder 12 is acted on by the pressure in control line 65 which leads to control valve 60. The control pump 10 draws hydraulic fluid from a storage container 1, via a filtering device 2 and a suction line 3. The suction line 3 may, as indicated by the dashed line, have a feed pump 5 connected in parallel to it which thereby draws hydraulic fluid via suction line 4 from the storage container 1 and feeds it to a feed circuit (not shown) as well as also to the control pump 10. The control pump 10 supplies the power steering hydraulic circuit (not shown) via a supply line 6; and via a load supply line 8 which branches off from supply line 6, supplies at least one additional hydraulic load. Included in the load supply line 8 is a priority valve 30 which preferentially supplies the power steering hydraulic circuit over all other loads.

The priority valve 30 is used as a pressure balance valve, wherein the pressure difference present at the steering valve (not shown) acts on the control piston of the priority valve. Therefore, an increase in the required output of the power steering hydraulic circuit will cause the feed of the hydraulic fluid to the load hydraulic circuit to be throttled. This is accomplished by the controller piston of the priority valve 30 which is controlled on one side via reference pressure line 34, by the upstream pressure of the steering valve (not shown) and on the other side, i.e. in the opposite direction, by a return spring 32 and the pressure in control line 31. The pressure in control line 31, when safety valve 40 is in position A (described more fully below), "conducts" the pressure in the control connection line 7, that is, the pressure in the power steering hydraulic circuit downstream of the steering valve (not shown). This in essence enables a "report" to be sent back which is representative of the pressure requirement of the power steering hydraulic circuit. Control connection line 9 is provided to "report" the pressure requirement of the load-hydraulic circuit wherein the pressure in the control connecting line 9 reproduces the pressure of the load-hydraulic circuit downstream of a control valve of a consuming device (not shown). Both control connection lines 7, 9 are connected to a change-over valve 70 whose outlet is coupled to a control pressure line 61 which controls the control valve 60 for the control pump 10. The control valve 60 is essentially a two position valve with three connections having a controller piston with two switch positions 1, 2. Control pump pressure P6 is connected via pressure line 64 to one end of the control valve or piston 60. The other end of control piston 60 has connected to it a spring 62 which operates in conjunction with the pressure in control pressure line 61. The pressure line 64 is in communication, via throttle D, with the control pressure line 61.

The pressure in actuator cylinders 11, 12 is controlled via control valve 60. For this purpose, control line 65 extends from the actuator piston 12 to the control valve 60 wherein control line 65 is connected with return line 63 when the control valve 60 is in switch position 2. The control line 65 is connected to pressure line 64 when the control valve 60 is in switch position 1. Therefore, depending upon the position of the actuator piston, control line 65 is connected either to storage container 1 or to a pressure line 64, which conducts the outlet pressure of control pump 10 whereby the angle of swing of control pump 10 can be changed. Therefore, pressure line 61 can control the angle of swing of control pump 10 as a function of the fluid requirement of a consuming device.

Safety valve 40 is also provided to protect control pump 10 from cavitation should the pressure $P_3$ in suction line 3 drop below an allowable minimum. The safety valve 40 has two main switch positions, A and C. An intermediate switch position B facilitates gentle switching from switch position A to switch position C. Safety valve 40 has an actuator piston which is biased at one end, by the force of spring 42 and the pressure in vacuum line 41 and at the other end, by the pressure in return line 63. As long as the pressure in vacuum line 41 is sufficiently high, safety valve 40 will be held in switch position A. Control line 31 is influenced by the pressure in control connection line 7 such that the priority valve 30 assumes a throttle-control position. Should the pressure P₃ drop below a minimum limit value, the actuator piston for the safety valve 40 is shifted from switch position A, through switch position B, by the force of spring 42 into switch position C. At that time, control connection line 7 is blocked and a connection is made between control line 31 and a pump pressure line 33 which branches off from supply line 6. This switching point for the safety valve 40 is accomplished through adjustment of the force of the spring 42 with respect to the end surfaces of the actuator piston which are acted upon by the pressure lines. When safety valve 40 is in switch position C, the control piston of priority valve 30 will experience equal pressure on both sides. As a result and due to the action of spring 32, the priority valve 30 assumes a shut-off position in which only the power steering hydraulic circuit is supplied.

Since the power steering hydraulic circuit (not shown) can take up only a small fraction of the maximum delivery volume of the control pump 10, even when the power steering hydraulic circuit is fully loaded, upon blocking of priority valve 30 a control actuation to a smaller output of the control pump 10 will take place in all cases through the use of control valve 60. This results in the pressure in suction line 3 thereby again rising so as to prohibit cavitation of the axial piston pump. When the pressure in suction line 3 again rises, safety valve 40 is displaced from switch position C through intermediate switch position B and thereby into switch position A such that the priority valve 30 now operates as a pressure balance or maintenance valve. Through the inclusion of the safety valve 40 in the hydraulic system, it has been found that an additional safety feature may be performed by the safety valve 40. Since the priority valve 30 is not able to recognize a leak in the region of the load-hydraulic circuit, there is a danger that the entire supply of hydraulic fluid might be lost which would result in a failure of the power steering. In order to insure that under all circumstances, there is a supply of power steering hydraulic fluid to the power steering hydraulic circuit, an actuator device 50 is associated with the safety valve 40, which actuator device positively brings said safety valve 40 into its second switch position C independently from the above described control operation of the safety valve. This is done by returning the safety valve 40 to the second switch position C of the valve in the event of a leak in the load-hydraulic circuit. More particularly, the actuator device 50 is controlled by a sensor 54 which detects the level of fluid in the storage container 1. The signal presented by sensor 54 is fed to an evaluation circuit 53, and the output of evaluation circuit 53 is connected, via signal line 52, to the actuator device 50. The actuator device 50 has, for instance, an actuator armature which is acted on by a spring 51. The armature is held via a magnetic field of a coil that surrounds it and that field overcomes the force of the displacement spring 51 when in the position shown in the FIGURE and when the level of fluid in the storage container 1 is sufficiently high. Should this level in container 1 drop below a minimum value, the current from the coil of the actuator device 50 will be removed via the evaluation circuit 53, such that the force of the spring 51 is released and the safety valve 40 is shifted into switch position C. The actual details of the circuit and actuator 50 would be readily known to one skilled in the art. Further, although the safety valve 40 and actuator device 50 are shown as separate parts, a single integrated solenoid valve may be utilized.

Accordingly, the present invention creates a safety circuit for a hydraulic system for the central supplying of hydraulic consuming devices and, in particular, agricultural tractors.

The present invention thus concerns a safety circuit haven a control pump which, via a priority valve, supplies both a power steering hydraulic circuit and at least one further load hydraulic circuit wherein, on a priority basis, the power steering hydraulic circuit is always supplied with power in preference to all other circuits. There is also provided a control circuit which limits the suction pressure of the control pump and has a safety valve which is controlled by the intake vacuum of the control pump. This valve effects a reduction in the pump output when the pressure in the suction line drops below a minimum pressure. The safety valve cooperates with a priority valve such that in its first switch position, when there is sufficient suction pressure, it brings the priority valve into a throttle position which first supplies the power steering hydraulic circuit with priority and in its second switch position, into a stable shut-off position which interrupts the supply of hydraulic fluid to the load-hydraulic circuit. The new integration of the safety valve into the hydraulic system not only protects the control pump from cavitation, but allows the safety valve to reliably supply the power steering hydraulic circuit even in the event of a leak in the load hydraulic circuit. Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. A safety circuit for a hydraulic system, comprising:
a control pump;
a first hydraulic load connected to said control pump;
a second hydraulic load;
a priority valve connected to said control pump and to said second hydraulic load, said priority valve having two operational conditions, one being a throttling condition for supplying the second hydraulic load and the other being a condition for prohibiting hydraulic fluid from being supplied from said control pump to said second hydraulic load;
a control circuit including a safety valve connected to said control pump for limiting the intake pressure of said control pump and for also reducing the output of said control pump, said safety valve further being connected to said priority valve wherein said safety valve maintains said priority valve in said first operational condition when the intake pressure of said control pump is at least a predetermined value and maintains said priority valve in said second operational condition when said intake pressure of said control pump falls below said predetermined value.

2. A safety circuit according to claim 1 wherein said priority valve supplies hydraulic fluid to said second hydraulic load when the hydraulic pressure to said first hydraulic load is above a predetermined value and prohibits hydraulic fluid from being supplied to said second hydraulic load when the hydraulic pressure to said first hydraulic load is below a predetermined value.

3. A safety circuit according to claim 1 wherein said safety valve is shiftable between a first switch position for maintaining said priority valve in said first operational condition when said intake pressure of said control pump is sufficiently high and a second switch position for maintaining said priority valve in said second operational condition when said intake pressure of said control pump falls below a predetermined value.

4. A safety circuit according to claim 3 further comprising a hydraulic fluid storage container for supplying hydraulic fluid to said hydraulic system, wherein said safety valve has an actuator piston therein, said positions of said safety valve being controlled by a spring biasing means in cooperation with said intake pressure of said control pump against a higher constant pressure, present in said hydraulic fluid storage container which supplies hydraulic fluid to said hydraulic system.

5. A safety circuit according to claim 4 wherein an actuator device is connected to and associated with said safety valve, said actuator device positively urging said safety valve into said second switch position when the hydraulic fluid level in said hydraulic fluid storage container falls below a predetermined level.

6. A safety circuit according to claim 5 further comprising a sensor; and wherein said actuator device is comprised of a solenoid, said sensor producing an output signal at output terminals thereof only when said fluid level in said hydraulic fluid storage container is above a predetermined level, said output terminals being connected to said solenoid, said output signal maintaining said actuator device in an actuated position which thereby maintains said safety valve in said first switch position, said solenoid further including a spring biasing means for urging said solenoid into a non-actuated position and thereby urging said safety valve into said second switch position in the absence of said output signal.

7. A safety circuit according to claim 3 wherein said safety valve is comprised of a three way/two position solenoid valve, said solenoid valve being shiftable to said first and second switch positions via a third position, said third position being intermediate said first and second switch positions.

8. A safety circuit according to claim 3 wherein when said intake pressure of said control pump is above a predetermined value, the hydraulic pressure requirements of said first hydraulic load and of said second hydraulic load, which are present in control connection lines, are transmitted through said safety valve to said priority valve, wherein when said intake pressure of said control pump is below a predetermined value, the output pressure of said control pump is connected through said safety valve to said priority valve while said control connection line coming from said first hydraulic load is blocked.

9. A safety circuit according to claim 1 further comprising actuator means connected to said safety valve for moving said safety valve to said second position when the hydraulic fluid level in said hydraulic system is below a predetermined level.

10. A safety circuit according to claim 1 wherein when said intake pressure of said control pump is above a predetermined value, the hydraulic pressure requirements of said first hydraulic load and of said second hydraulic load which are present in control connection lines, are transmitted through said safety valve to said priority valve, wherein when said intake pressure of said control pump is below a predetermined value, the output pressure of said control pump is connected through said safety valve to said priority valve while said control connection line coming from said first hydraulic load is blocked.

11. A safety circuit according to claim 1 wherein an input of said priority valve is connected to the hydraulic fluid supply line of said first hydraulic load and the output of said priority valve is connected to said second hydraulic load, the priority valve thereby acting as pressure balance.

12. A safety circuit according to claim 11 including a control line having hydraulic pressure therein, said hydraulic pressure in said control line being representative of the hydraulic pressure requirements of said first hydraulic load and of said second hydraulic load, said safety circuit further comprising a control piston which is disposed in said priority valve, wherein said control piston is biased in a first direction by the hydraulic pressure in said hydraulic fluid supply line and in a second direction by a spring biasing means and by the hydraulic pressure in said control line, said control line further being connected to said safety valve.

13. A safety circuit according to claim 12 wherein said control line is connected to said control pump when said intake pressure of said control pump is below a predetermined value and is operatively connected to sense the hydraulic pressure requirements of said first hydraulic load and of said second hydraulic loads when said intake pressure of said control pump is above a predetermined value.

14. A safety circuit according to claim 1 wherein said safety circuit further comprises a control valve which is connected to said control pump, said control valve controlling said output of said control pump as a function of the hydraulic fluid requirements of said first hydraulic load and of said second hydraulic load.

15. A safety circuit device according to claim 14 further comprising a change-over valve having inputs which receive pressures representing the requirements of said first hydraulic load and said second hydraulic load and further having an output which transmits the higher of the respective hydraulic pressures at the inputs therein, said output of said change-over valve being connected to said control valve, wherein said control valve controls said output of said control pump as a function of said hydraulic pressure of said output of said change-over valve.

16. A safety circuit according to claim 1 wherein said control circuit further comprises a control valve connected to said control pump for controlling said output of said control pump in response to the hydraulic fluid requirements of said first hydraulic load and said second hydraulic load.

17. A safety circuit for a hydraulic system, comprising:
 a control pump;
 a first hydraulic load connected to said control pump;
 a second hydraulic load;
 a priority valve connected to said control pump and a second hydraulic load, said priority valve having two operational conditions, the first being a throttling condition for supplying the second hydraulic load and the second being a condition for prohibiting hydraulic fluid from being supplied from said control pump to said second hydraulic load; and
 a control circuit including a safety valve which is shiftable between a first switch position for maintaining said priority valve in said first operational condition when the intake pressure of said control pump is sufficiently high and a second position for maintaining said priority valve in said second operational position when said intake pressure of said control pump fails below a predetermined value, said safety valve being connected to said control pump and also reducing the output of said control pump;

a change-over valve having inputs which receive pressures representing the requirements of said first hydraulic load and said second hydraulic load and further having an output which transmits the higher of the respective hydraulic pressures at the inputs therein;

a control valve connected to said control pump and to said change-over valve, said control valve controlling said output of said control pump as a function of the hydraulic fluid requirements of said first hydraulic load and said second hydraulic load;

a hydraulic fluid storage container for supplying hydraulic fluid to said hydraulic system, wherein said safety valve has an acutator piston therein, said positions of said safety valve being controlled by a spring biasing means in cooperation with said intake pressure of said control pump against a higher constant pressure present in said hydraulic fluid storage container which supplies hydraulic fluid to said hydraulic system; and an actuator device positively urging said safety valve into said second switch position when the hydraulic valve level in said hydraulic fluid storage container falls below a predetermined level, said actuator device further comprising a solenoid, wherein a sensor produces an output signal at output terminals thereat only when said fluid level lin said hydraulic fluid storage container is above a predetermined level, said output terminals being connected to said solenoid, said output signal maintaining said actuator device in an actuated position which thereby maintains said safety valve in said first switch position, said solenoid further including a spring biasing means for urging said solenoid into a non-actuated position and thereby urging said safety valve into said second switch position in the absence of said output signal.

* * * * *